United States Patent
Ko et al.

(10) Patent No.: US 11,681,947 B2
(45) Date of Patent: Jun. 20, 2023

(54) METHOD AND APPARATUS FOR SELECTING MODEL OF MACHINE LEARNING BASED ON META-LEARNING

(71) Applicant: SAMSUNG ELECTRONICS CO., LTD., Suwon-si (KR)

(72) Inventors: Jeong-Hoon Ko, Hwaseong-si (KR); Jae-Jun Lee, Suwon-si (KR); Seong-Je Kim, Seongnam-si (KR); In Huh, Seoul (KR); Chang-Wook Jeong, Hwaseong-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 892 days.

(21) Appl. No.: 16/518,104

(22) Filed: Jul. 22, 2019

(65) Prior Publication Data
US 2020/0042896 A1 Feb. 6, 2020

(30) Foreign Application Priority Data
Aug. 2, 2018 (KR) .................. 10-2018-0090334

(51) Int. Cl.
*G06N 20/00* (2019.01)
*G06F 17/15* (2006.01)
*G06F 17/18* (2006.01)
*G06F 11/34* (2006.01)

(52) U.S. Cl.
CPC ......... *G06N 20/00* (2019.01); *G06F 11/3495* (2013.01); *G06F 17/15* (2013.01); *G06F 17/18* (2013.01)

(58) Field of Classification Search
CPC combination set(s) only.
See application file for complete search history.

(56) References Cited

U.S. PATENT DOCUMENTS

| 6,249,781 | B1 | 6/2001 | Sutton |
| 6,728,689 | B1 | 4/2004 | Drissi et al. |
| 6,842,751 | B1 | 1/2005 | Vilalta et al. |
| 6,886,009 | B2 | 4/2005 | Jeng et al. |
| 7,603,330 | B2 | 10/2009 | Gupta et al. |

(Continued)

OTHER PUBLICATIONS

Bergstra, et al., "Algorithms for Hyper-Parameter Optimization". Proceeding NIPS'11 Proceedings of the 24th International Conference on Neural Information Processing Systems, Granada, Spain, Dec. 12-15, 2011.

(Continued)

*Primary Examiner* — Arif Ullah
(74) *Attorney, Agent, or Firm* — F. Chau & Associates, LLC

(57) ABSTRACT

A method of selecting a model of machine learning executed by a processor is provided. The method includes: receiving at least one data-set; configuring a configuration space for machine learning of the at least one data-set; extracting, from the at least one data-set, a meta-feature including quantitative information about the data-set; calculating performance of the machine learning for the at least one data-set based on a plurality of configurations included in the configuration space; executing meta-learning based on the meta-feature, the plurality of configurations, and the calculated performance; and optimizing the configuration space based on a result of executing the meta-learning.

15 Claims, 13 Drawing Sheets

(56) References Cited

U.S. PATENT DOCUMENTS

| | | | |
|---|---|---|---|
| 7,987,144 B1 | 7/2011 | Drissi et al. | |
| 8,244,652 B2 | 8/2012 | Menahem et al. | |
| 8,725,666 B2 | 5/2014 | Lemmond et al. | |
| 9,256,838 B2 | 2/2016 | Sow et al. | |
| 2002/0161677 A1* | 10/2002 | Zumbach | G06Q 40/00 |
| | | | 707/E17.001 |
| 2015/0193699 A1 | 7/2015 | Kil et al. | |
| 2016/0110657 A1 | 4/2016 | Gibiansky et al. | |
| 2017/0068905 A1 | 3/2017 | Klinger et al. | |
| 2017/0249434 A1* | 8/2017 | Brunner | G06F 16/258 |
| 2017/0286839 A1 | 10/2017 | Parker | |
| 2018/0018565 A1* | 1/2018 | Kurokawa | G11C 13/0038 |
| 2018/0046926 A1* | 2/2018 | Achin | G06N 20/20 |
| 2018/0343171 A1* | 11/2018 | Jensen | H04L 41/16 |
| 2019/0034798 A1* | 1/2019 | Yu | G06N 3/084 |

OTHER PUBLICATIONS

Thornton, Chris, et al., "Auto-Weka: Combined Selection and Hyperparameter Optimization of Classification Algorithms", arXIV:1208.3719v2 [cs.LG], Mar. 6, 2013.

Feurer, Matthias et al., "Efficient and Robust Automated Machine Learning", Published in NIPS 2015.

Lorena, Ana C., et al. "Data Complexity Meta-Features for Regression Problems", Mach Learn (2018) 107:209-246.

\* cited by examiner

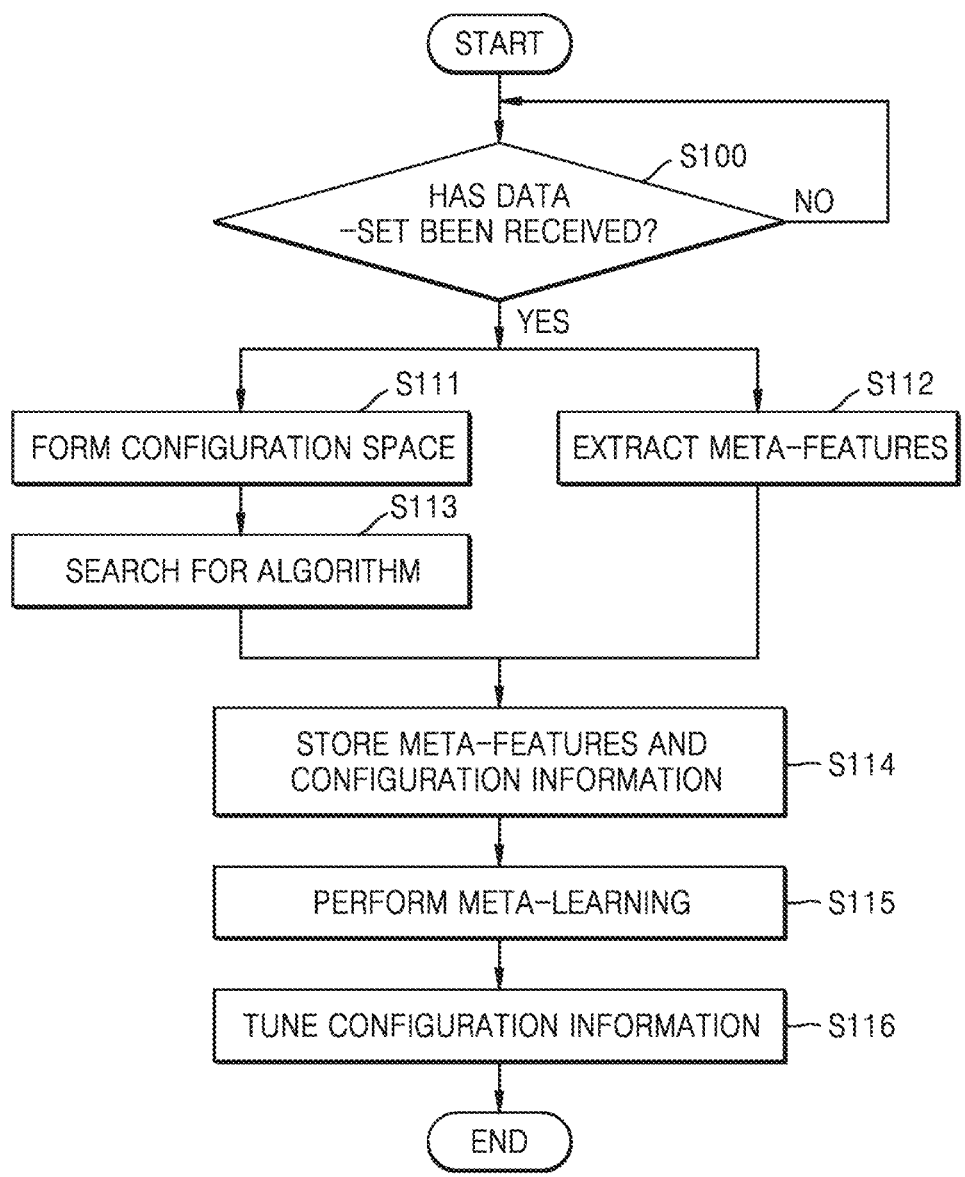

FIG. 7A

| Category | No. | Code | Description |
|---|---|---|---|
| Correlation | 1 | $C_1$ | Maximum feature correlation to the output |
| | 2 | $C_2$ | Average feature correlation to the output |
| | 3 | $C_3$ | Individual feature efficiency |
| | 4 | $C_4$ | Collective feature efficiency |
| Linearity | 5 | $L_1$ | Mean absolute error of linear regressor |
| | 6 | $L_2$ | Residual variance |
| | 7 | $L_3$ | Non-linearity of a linear regressor |
| Smoothness | 8 | $S_1$ | Output distribution |
| | 9 | $S_2$ | Input distribution |
| | 10 | $S_3$ | Error of a nearest neighbor (feature space) regressor |
| | 11 | $S_4$ | Non-linearity of nearest neighbor (feature space) regressor |
| Density | 12 | $D_1$ | Number of observations (log) |
| | 13 | $D_2$ | Number of observations per feature |
| | 14 | $D_3$ | PCA 95% |
| | 15 | $D_4$ | Missing ratio |

| Category | No. | Code | Description |
|---|---|---|---|
| Correlation | 1 | $C_1$ | Maximum feature correlation to the output |
| | 2 | $C_2$ | Average feature correlation to the output |
| | 3 | $C_3$ | Individual feature efficiency |
| | 4 | $C_4$ | Collective feature efficiency |
| Linearity | 5 | $L_1$ | Mean absolute error of linear regressor |
| | 6 | $L_2$ | Residual variance |
| | 7 | $L_3$ | Non-linearity of a linear regressor |
| Smoothness | 8 | $S_1$ | Output distribution |
| | 9 | $S_2$ | Input distribution |
| | 10 | $S_3$ | Error of a nearest neighbor (feature space) regressor |
| | 11 | $S_4$ | Non-linearity of nearest neighbor (feature space) regressor |
| | 12 | $S_5$ | Error of a 2-nearest neighbor chip regression on wafer |
| | 13 | $S_6$ | Error of a linear interpolation on wafer |
| Density | 14 | $D_1$ | Number of observations (log) |
| | 15 | $D_2$ | Number of observations per feature |
| | 16 | $D_3$ | PCA 95% |
| | 17 | $D_4$ | Missing ratio |
| | 18 | $D_5$ | Measured chip distribution randomness |
| | 19 | $D_6$ | Measured chip ratio on wafer |
| Wafer Statistics | 20 | $W_1$ | Inter/Intra wafer average difference |
| | 21 | $W_2$ | Inter/Intra wafer variance difference |
| | 22 | $W_3$ | Inter/Intra wafer skewness difference |
| | 23 | $W_4$ | Inter/Intra wafer kurtosis difference |
| | 24 | $W_5$ | Radial variance |
| Meta Information | 25 | $M_1$ | Product |
| | 26 | $M_2$ | Development Stage |

$$L_1 = \frac{1}{T}\sum_{i=1}^{T}(f(x_i) - y_i)^2$$

$$S_1 = \frac{1}{m}\sum_{i,j\in MST}\|b_i - y_j\|$$

$$S_2 = \frac{1}{n}\sum_{i=1}^{n}\|b_i - x_{i+1}\|$$

$$S_3 = \frac{1}{T}\sum_{i=1}^{T}(ANN(x_i) - y_i)^2$$

$$S_4 = \frac{1}{T}\sum_{i=1}^{T}(ANN(x_i) - y_i)^2$$

$$S_5 = \frac{1}{T}\sum_{i=1}^{T}(2NN_W(x_i) - y_i)^2$$

$$S_6 = \frac{1}{T}\sum_{i=1}^{T}(f_R(x_{t-1}, x_{t-1}) - y_i)$$

$$D_1 = \log 10(n)$$

$$D_2 = \frac{n}{d}$$

$$D_3 = PCA(x) > 95\%$$

$$D_4 = \frac{m}{n \times d}$$

$$D_5 = \sigma(d_M(missing))$$

$$D_6 = \frac{c_{measured}}{c_{total}}$$

$$W_1 = E[x_{agg}] - E[x_{in}]$$

$$W_2 = Var(x_{agg}) - Var(x_{in})$$

$$W_3 = E\left[\left(\frac{x_{out} - \mu_{out}}{\sigma}\right)^3\right] - E\left[\left(\frac{x_{in} - \mu_{in}}{\sigma}\right)^3\right]$$

$$W_4 = E\left[\left(\frac{x_{out} - \mu_{out}}{\sigma}\right)^4\right] - E\left[\left(\frac{x_{in} - \mu_{in}}{\sigma}\right)^4\right]$$

$$W_5 = Var(f(v))$$

$$C_1 = \max_{j=1...d}|\rho(x^j, y)|$$

$$C_2 = \sum_{j=1}^{d}\frac{|\rho(x^j, y)|}{d}$$

$$C_3 = \min_{j=1...d}\frac{m^j}{m}$$

$$C_4 = \frac{\#N_v|k_v| > 0.1 k_v}{n}$$

$$L_2 = \frac{1}{T}\sum_{i=1}^{T}$$

$$L_3 = \frac{1}{T}\sum_{i=1}^{T}$$

TB3

METHOD AND APPARATUS FOR SELECTING MODEL OF MACHINE LEARNING BASED ON META-LEARNING

CROSS-REFERENCE TO RELATED APPLICATION

This U.S. non-provisional application claims the benefit of and priority under 35 U.S.C. 119 to Korean Patent Application No. 10-2018-0090334, filed on Aug. 2, 2018, in the Korean Intellectual Property Office, the disclosure of which is incorporated by reference in its entirety herein.

BACKGROUND

1. Technical Field

The inventive concept relates to a method and apparatus for selecting a model of machine learning, and more particularly, to a method and apparatus for selecting a model of machine learning based on meta-learning.

2. Discussion of Related Art

Machine learning is widely used to classify collected data or to learn models that can be used to characterize the collected data. Various techniques for machine learning have been developed. To obtain optimal learning performance in machine learning, it is required to learn various configurations for the machine learning in an appropriately abbreviated form according to a machine learning algorithm, rather than using the collected data as it is.

SUMMARY

At least one embodiment of the inventive concept provides a method and apparatus for selecting a model of machine learning, and more particularly, a method and apparatus for optimizing a configuration space which is a basis for selecting a model based on meta-learning.

According to an exemplary embodiment of the inventive concept, there is provided a method of selecting a model of machine learning executed by a processor. The method includes: receiving at least one data-set; configuring a configuration space for machine learning of the at least one data-set; extracting, from the at least one data-set, a meta-feature including quantitative information about the data-set; calculating performance of the machine learning for the at least one data-set based on a plurality of configurations included in the configuration space; executing meta-learning based on the meta-feature, the plurality of configurations, and the performance; and optimizing the configuration space based on a result of the executing of the meta-learning.

According to an exemplary embodiment of the inventive concept, there is provided a method of selecting a model of machine learning executed by a processor. The method includes: receiving a data-set; forming a configuration space for the machine learning based on the data-set; searching for a machine learning algorithm based on a plurality of configurations among the configuration space; outputting information about the plurality of configurations and information about performance of the machine learning algorithm based on the plurality of configurations; extracting, from the data-set, a meta-feature including quantitative information about at least one of information about correlation associated with the data-set, information about linearity, information about smoothness, and information about a distribution density; executing the meta-learning based on the meta-feature, the plurality of configurations, and the performance; and optimizing the configuration space based on a result of the executing of the meta-learning.

According to an exemplary embodiment of the inventive concept, there is provided a device including: a memory configured to store computer-readable code therein; and a processor operatively coupled to the memory, the processor configured to execute the computer-readable code, wherein the computer-readable code is configured to: receive at least one data-set; form a configuration space for machine learning of the at least one data-set; derive a performance of the machine learning for the at least one data-set based on a first configuration included in the configuration space; extract, from the at least one data-set, a meta-feature including quantitative information about the at least one data-set; execute meta-learning based on the meta-feature, the first configuration, and the performance; and optimize the configuration space based on a result of executing the meta-learning.

BRIEF DESCRIPTION OF THE DRAWINGS

Embodiments of the inventive concept will be more clearly understood from the following detailed description taken in conjunction with the accompanying drawings in which:

FIG. 4 is a flowchart of an operation method of an apparatus according to an exemplary embodiment of the inventive concept;

FIG. 7A illustrates a first table including meta-features according to an exemplary embodiment, FIG. 7B illustrates a second table including meta-features according to an exemplary embodiment, and FIG. 8 shows a third table including formulas for deriving respective meta-features;

DETAILED DESCRIPTION OF THE EXEMPLARY EMBODIMENTS

Hereinafter, exemplary embodiments of the inventive concept are described in detail with reference to the accompanying drawings.

Figure 1:
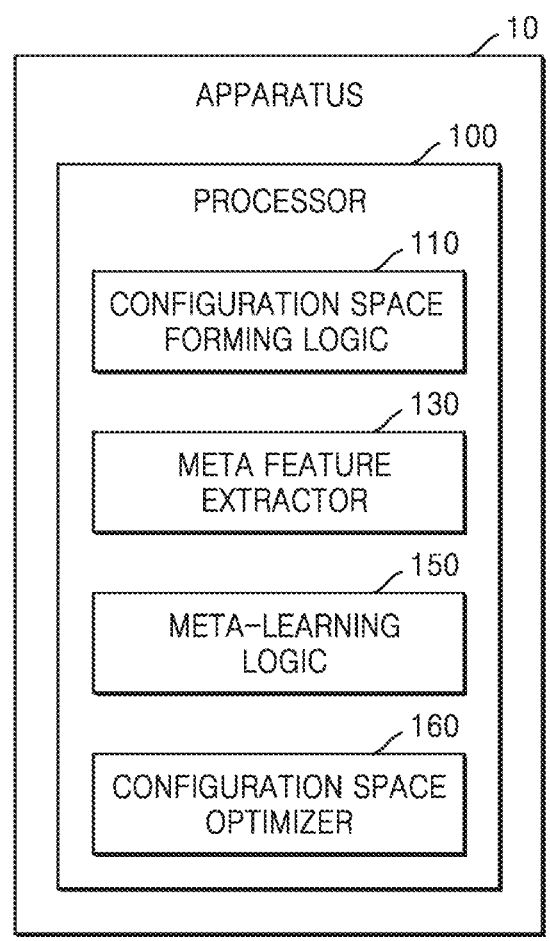
FIG. 1 is a block diagram illustrating an apparatus according to an exemplary embodiment of the inventive concept.

FIG. 1 is a block diagram illustrating an apparatus 10 according to an exemplary embodiment of the inventive concept.

Referring to FIG. 1, the apparatus 10 includes a processor 100 capable of executing various computer programs. The apparatus 10 may be an apparatus for executing various operations associated with machine learning and may correspond to a computing system having various processing capabilities such as selection of one of a plurality of models of the machine learning, optimization of parameters related to the machine learning, and the machine learning based on a selected model of the machine learning (for example, classification, regression, clustering, and generation). For example, the apparatus 10 may be implemented as various types of devices such as a personal computer (PC), a server, and a mobile device.

Although not illustrated, the apparatus 10 may further include a memory in which various computer programs to be executed by the processor 100 are stored. The memory (not illustrated) may include at least one of a volatile memory and a nonvolatile memory.

The processor 100 may execute various operations related to an overall function for controlling the apparatus 10, and the machine learning. For example, the processor 100 may execute various operations related to an overall function for controlling the apparatus 10, and the machine learning by executing programs stored in the memory (not illustrated). The processor 100 may be implemented by a central processing unit (CPU), a graphics processing unit (GPU), a digital signal processor (DSP), a neural processing unit (NPU), or an application processor (AP), which is provided in the apparatus 10, but is not limited thereto. For example, the NPU may be a microprocessor that specializes in the acceleration of machine learning algorithms.

In an embodiment, the processor 100 drives at least one of a configuration space forming logic 110, a meta-feature extractor 130, a meta-learning logic 150, and a configuration space optimizer 160. Each of the configuration space forming logic 110, the meta-feature extractor 130, the meta-learning logic 150, and the configuration space optimizer 160 may include a software block including a plurality of instructions to be executed by the processor 100, or may include a hardware block including analog circuits and/or digital circuits.

In an exemplary embodiment, the configuration space forming logic 110 forms different models of the machine learning and a configuration space formed by various parameters corresponding to the different models. For example, the configuration space formed by the configuration space forming logic 110 may be constructed based on a plurality of algorithms for executing the machine learning, preprocessing correlation information, and hyper-parameter correlation information.

The meta-feature extractor 130 may extract a meta-feature from a data-set received from, for example, a user or a system. In an embodiment, the meta-feature is a quantitative characteristic of the data-set. When the data-set is input, the meta-feature extractor 130 may automatically extract the meta-feature based on at least one of statistical characteristics, complexity, noise, correlation, and missing value distribution. Meta-features may also be referred to as a characterization measures, which can be used to characterize the complexity of datasets and provide estimates of algorithm performance.

The meta-learning logic 150 may execute meta-learning based on results of other configurations to be implemented in the processor 100. In the meta-learning logic 150 executes the meta-learning based on the meta-feature of the input data-set extracted by the meta-feature extractor 130, a certain configuration provided in the configuration space formed by the configuration space forming logic 110, and performance of the machine learning on the input data-set based on the certain configuration. For example, the meta-learning logic 150 may execute the machine learning on relationships between the meta-feature, the certain configuration, and performance.

In an embodiment, the configuration space optimizer 160 optimizes the configuration space based on an operation result of the meta-learning logic 150. In other words, the configuration space optimizer 160 may control the configuration space forming logic 110 to form an optimized configuration space based on the operation result of the meta-learning logic 150.

In an embodiment, the configuration space optimizer 160 selects a certain configuration space to be excluded from a currently formed configuration space, based on an execution result of the meta-learning. For example, the configuration space optimizer 160 selects some space of the configuration space to be excluded. In an embodiment, the configuration space optimizer 160 outputs information about the certain configuration space to be excluded from the currently formed configuration space to the configuration space forming logic 110. According to an exemplary embodiment of the inventive concept, the configuration space forming logic 110 tunes the configuration space for the machine learning based on a result of the meta-learning performed on the data-set, and accordingly, the time during which an optimal model of the machine learning is constructed may be reduced. In addition, since the optimal model of the machine learning is automatically constructed according to the result of the meta-learning, requirements of computing resources and human resources may be reduced.

Figure 2:
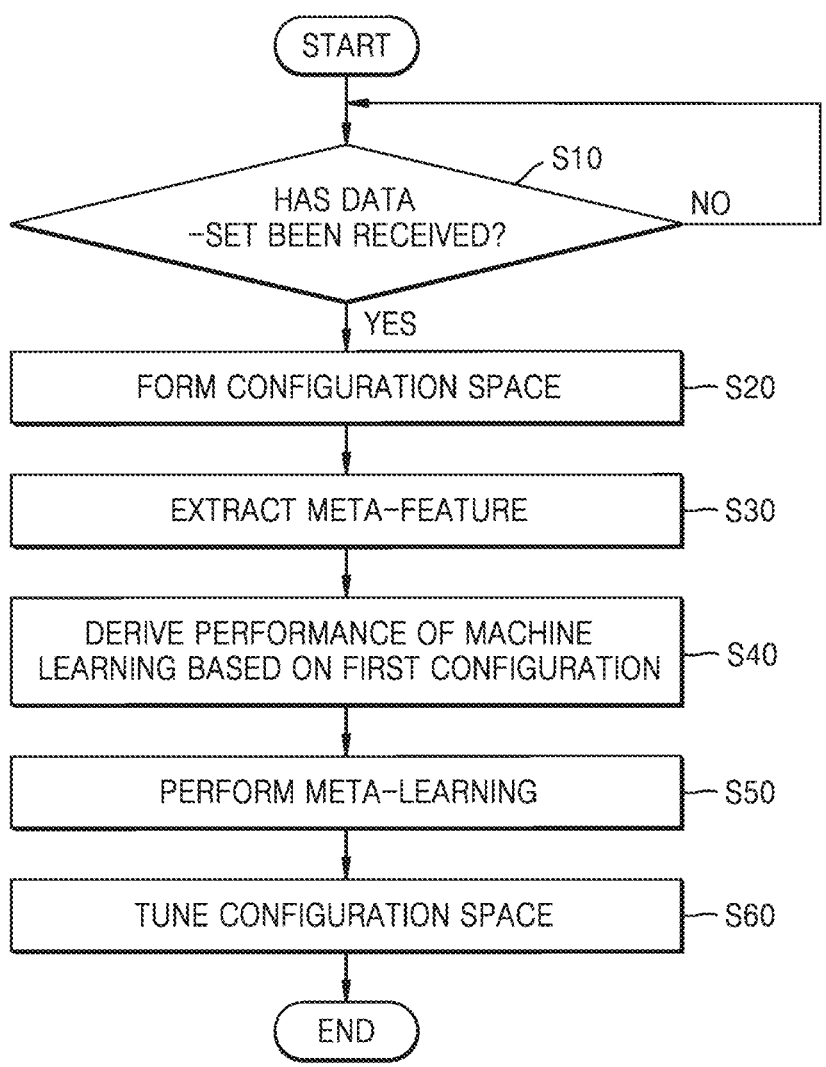
FIG. 2 is a flowchart of an operation method of a processor according to an exemplary embodiment of the inventive concept.

FIG. 2 is a flowchart of an operation method of the processor 100 according to an exemplary embodiment of the inventive concept. Hereinafter, FIG. 2 is described with reference to FIG. 1.

Referring to FIG. 2, the processor 100 verifies whether the data-set is received (S10). When the data-set is not received, the processor 100 does not proceed to a next step. When the data-set is received from the system or the user, the processor 100 performs the next step.

When the data-set is received, the processor 100 constructs the configuration space (S20). For example, the processor 100 may form the configuration space for the machine learning of the data-set by driving the configuration space forming logic 110. For example, the configuration space may be formed from the received data-set.

Next, the processor 100 extracts a meta-feature from the data-set (S30). For example, when the data-set is input, the processor 100 may extract the meta-feature from the data-set by driving the meta-feature extractor 130. While the extraction of the meta-feature (S30) may be executed after the forming of the configuration space (S20), the inventive concept is not limited thereto. For example, the extraction of the meta-feature (S30) may be executed before the forming of the configuration space (S20) or before the extraction of the meta-feature (S30). For example, the forming of the configuration space (S20) and the extraction of the meta-feature (S30) may be simultaneously executed.

Next, the processor 100 samples a first configuration in the configuration space and derives a performance according to executing the machine learning on the data-set based on the first configuration (S40). In an embodiment, the processor 100 executes the machine learning on the data-set based on the first configuration, and then calculates a score according to a certain criterion. In an embodiment, the calculated score is a measure of a performance of the machine learning using the first configuration.

Next, the processor 100 executes the meta-learning (S50). For example, the processor 100 may execute the meta-learning by driving the meta-learning logic 150. In an embodiment, the processor 100 executes the meta-learning based on the meta-feature extracted from the data-set, the first configuration, and the performance of the machine learning measured according to the first configuration.

Next, the processor 100 tunes the configuration space based on an execution result of the meta-learning (S60). For example, the processor 100 may tune the configuration space based on the execution result of the meta-learning by driving the configuration space optimizer 160 to control the configuration space forming logic 110. In the embodiment, the processor 100 selects a certain configuration space to be excluded from the configuration space based on the execution result of the meta-learning. The selected certain configuration space is used to tune the configuration space.

Figure 3A:
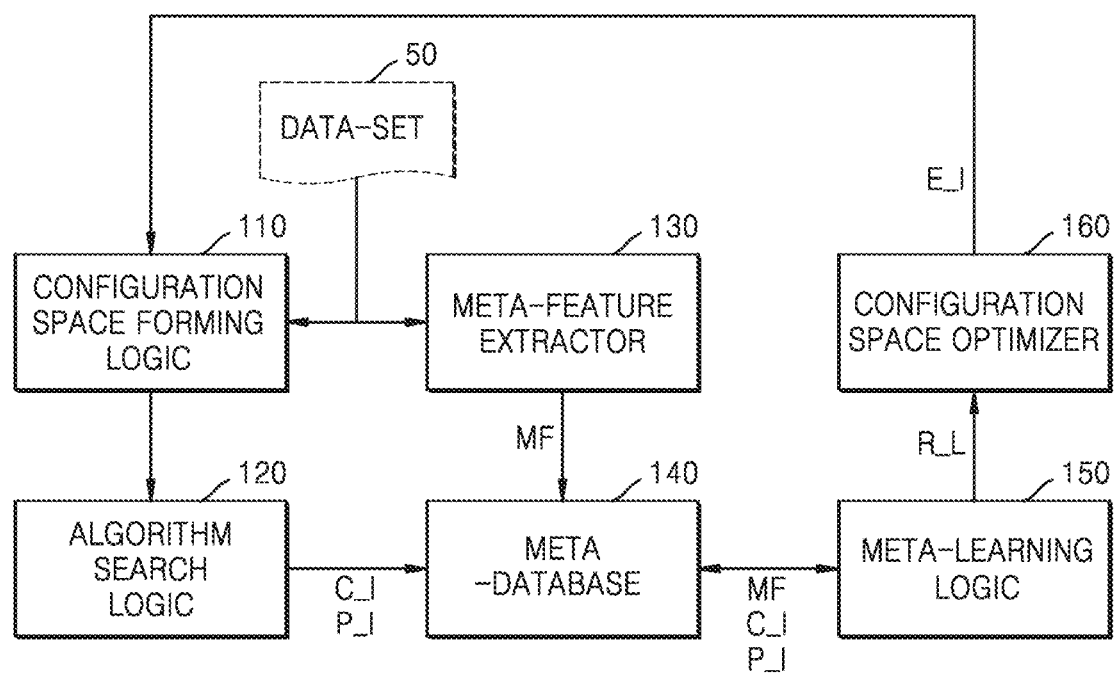
FIG. 3A is a detailed block diagram of an apparatus according to an exemplary embodiment of the inventive concept.
Figure 3B:
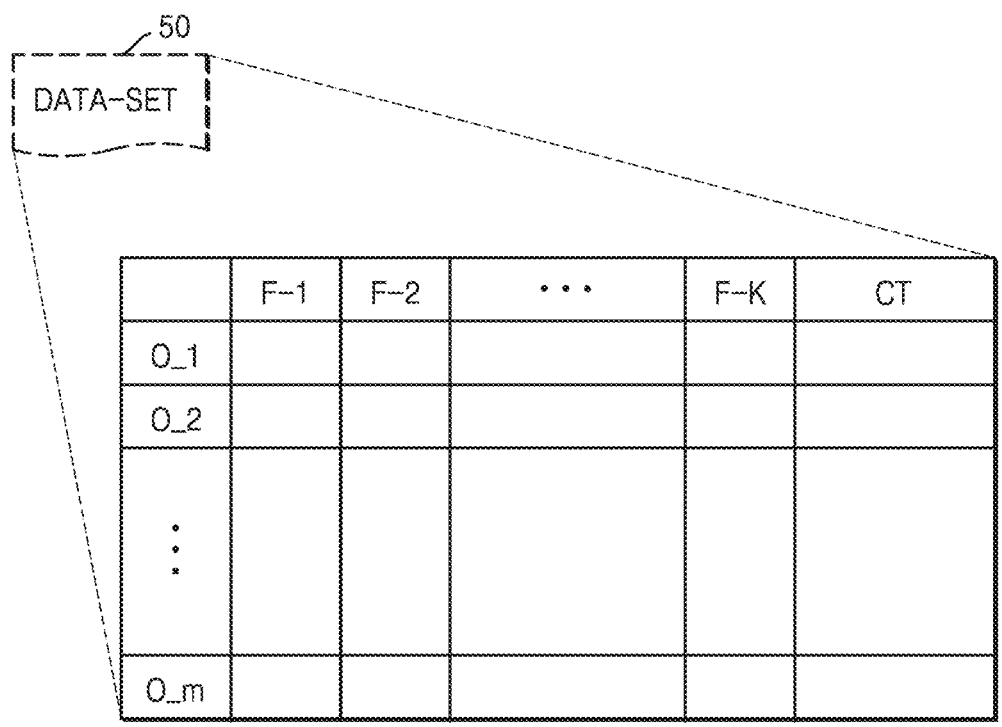
FIG. 3B is an example of a data-set illustrated in FIG. 3A.

FIG. 3A is a detailed block diagram of the apparatus 10 according to an exemplary embodiment of the inventive concept, and FIG. 3B is an example of a data-set 50 illustrated in FIG. 3A.

Referring to FIG. 3A, the apparatus 10 includes the configuration space forming logic 110, an algorithm search logic 120, the meta-feature extractor 130, a meta-database 140, the meta-learning logic 150, and the configuration space optimizer 160. For example, at least one of the configuration space forming logic 110, the algorithm search logic 120, the meta-feature extractor 130, the meta-learning logic 150, and the configuration space optimizer 160 may be driven by the processor 100 in FIG. 1.

The data-set 50 may be input to the configuration space forming logic 110 and the meta-feature extractor 130. For example, the data-set 50 may be input from a system or a user external to the apparatus 10. The data-set 50 may include a plurality of pieces of example data (e.g., training data) for the machine learning.

Referring further to FIG. 3B, a configuration of the data-set 50 may be described in a table form. The data-set 50 may include information about first through $m^{th}$ objects O_1 through O_m (where m is a positive integer greater than one) which are different from each other. Information about each of the first through $m^{th}$ objects O_1 through O_m may be classified into first through $k^{th}$ features F-1 through F-k (where k is a positive integer greater than one) which are different from each other. In addition, each of the first through $m^{th}$ objects O_1 through O_m may be classified by a category CT.

Referring again to FIG. 3A, the configuration space forming logic 110 forms the configuration space based on the received data-set 50. The configuration space may include multiple models of the machine learning for the data-set 50 and correlation information about multiple parameters. In an embodiment, the configuration space forming logic 110 forms the configuration space based on multiple algorithms correlation information, preprocessing correlation information, and hyper-parameter correlation information for executing the machine learning. In an embodiment, a hyper-parameter is a parameter whose value is set before the learning process begins. The time required to train and test a model can depend on the choice of its hyper-parameters.

For example, the preprocessing correlation information may include information about a preprocessing methodology. In addition, the hyper-parameter correlation information may include at least one of hyper-parameter correlation information corresponding to the preprocessing and hyper-parameter correlation information corresponding to a machine learning algorithm.

In an embodiment, the configuration space forming logic 110 samples certain configurations included in the configuration space and transfers a sampling result to the algorithm search logic 120. Accordingly, the algorithm search logic 120 may execute an algorithm search operation of the machine learning on the data-set 50, for example, based on the first configuration included in the configuration space.

In an embodiment, the algorithm search logic 120 searches for an algorithm by using a grid search method, a random search method, or a Bayesian optimization method. As an example, the algorithm search logic 120 may search for grids in a search space designated by the user or the system by using the grid search method. As another example, the algorithm search logic 120 may form an entire configuration by extracting each configuration selection criterion from a particular distribution within a particular range, without defining a grid, by using the random search method. In addition, as another example, the algorithm search logic 120 may define a prior distribution by using the Bayesian optimization method and calculate a posterior distribution based on a previous search operation. Then, the algorithm search logic 120 may select the highest expected performance improvement by calculating an expected improvement based on the posterior distribution.

The algorithm search operation of the algorithm search logic 120 may include an execution operation of the machine learning performed on a data-set based on each algorithm. In an embodiment, the algorithm search logic 120 executes the machine learning based on each algorithm and derives a performance P_I of each algorithm based on a result of the performing of the machine learning. For example, the algorithm search logic 120 may execute the machine learning based on each algorithm and calculate a score as the performance P_I according to a certain criterion. In an embodiment, the algorithm search logic 120 may output to the meta-database 140 configuration information C_I (for example, the first configuration) and the performance P_I of the algorithm that are bases of executing an operation.

The meta-feature extractor 130 may extract a meta-feature MF from the received data-set 50. For example, the meta-feature extractor 130 may extract the meta-feature MF based on at least one of statistical characteristics, complexity, noise, correlation, and missing distribution of the data-set 50. The meta-feature extractor 130 may execute an extraction operation automatically when the data-set 50 is input. In an embodiment, the meta-feature extractor 130 outputs the extracted meta-feature MF to the meta-database 140.

The meta-database 140 may store the configuration information C_I and the performance P_I of the algorithm that are received from the algorithm search logic 120. In addition, the meta-database 140 may store the meta-feature MF received from the meta-feature extractor 130. Although the meta-database 140 is illustrated as being provided within the apparatus 10, the inventive concept is not limited thereto. For example, the meta-database 140 may be provided outside the apparatus 10 and connected to the apparatus 10 via a certain network communication network.

For example, the meta-database 140 may include at least one of a volatile memory or a nonvolatile memory. The nonvolatile memory may include read-only memory (ROM), programmable ROM (PROM), electrically programmable ROM (EPROM), electrically erasable PROM (EEPROM), a flash memory, phase-change random-access memory (RAM) (PRAM), magnetic RAM (MRAM), resistive RAM (RRAM), ferroelectric RAM (FRAM), etc. The volatile memory may include dynamic RAM (DRAM), static RAM (SRAM), synchronous RAM (SDRAM), etc. In an embodiment, the meta-database 140 may include at least one of a hard disk drive (HDD), a solid state drive (SSD), a compact flash (CF), a secure digital (SD), a micro secure digital (Micro-SD), a mini secure digital (Mini-SD), an extreme digital (xD) or a memory stick.

The meta-database 140 may provide the configuration information C_I, the performance P_I of the algorithm, and the meta-feature MF, which are stored in the meta-database, to the meta-learning logic 150. In an embodiment, the meta-learning logic 150 executes the meta-learning based on the configuration information C_I, the performance P_I of the algorithm, and the meta-feature MF received from the meta-database 140. In the embodiment, the meta-learning logic 150 may learn a relationship of Formula 1 below.

$$P\_I = f(MF, C\_I) \quad \text{Formula 1}$$

In an embodiment, the meta-learning logic 150 executes the machine learning on the particular relationship of f(MF, C_I) from which the performance P_I is output in response to an input of the meta-feature MF and the configuration information C_I. In an embodiment, the meta-learning logic 150 may execute the machine learning by using a surrogate model that is used in a tree-structured Parzen estimator (TPE) or sequential model-based algorithm configuration (SMAC). For example, the meta-learning logic 150 may execute the machine learning based on at least one of a Gaussian mixture model and a random forest model.

In an embodiment, the meta-learning logic 150 derives a statistical value of the performance P_I according to the configuration information C_I based on the meta-feature MF. For example, the meta-learning logic 150 may derive an empirical mean and variance of the performance P_I according to the configuration information C_I. The meta-learning logic 150 may calculate an expected improvement and an expected worsening (e.g., expected degradation) for each configuration of the configuration space based on the derived empirical mean and variance and provide a result of the calculation to the configuration space optimizer 160 as an execution result R_L of the meta-learning.

The configuration space optimizer 160 may derive information for optimizing the configuration space based on the received execution result R_L and provide the derived information to the configuration space forming logic 110. In an embodiment, the configuration space optimizer 160 selects a configuration to be excluded from the configuration space based on the execution result R_L and accordingly, outputs exclusion configuration information E_I.

In an embodiment, when information about an expected improvement value and an expected degradation value is included in the execution result R_L, the configuration space optimizer 160 may select the configuration to be excluded based on the expected improvement value and the expected deterioration value. For example, when a value obtained by dividing the expected deterioration value by the expected improvement value is greater than a certain reference value, with respect to the expected deterioration value and the expected improvement value according to an arbitrary first configuration in the configuration space, the first configuration may be selected as the configuration to be excluded from the configuration space. Alternatively, when the expected deterioration value is equal to or greater than the first reference value and the expected improvement value is equal to or less than a second reference value, with respect to the expected deterioration value and the expected improvement value according to the first configuration, the configuration space optimizer 160 may select the first configuration as the configuration to be excluded from the configuration space. The first reference value and the second reference value may be the same value or may be different values.

The configuration space forming logic 110 may adjust the configuration space based on the received exclusion configuration information E_I. In other words, the configuration space forming logic 110 may tune the configuration space by excluding some of the configuration space based on the configuration selected by the configuration space optimizer 160.

According to an exemplary embodiment of the inventive concept, in a configuration search for selecting a model of machine learning, a configuration space to be subjected to the configuration search is adaptively optimized based on the meta-feature of the data-set. Thus, by limiting a search space to only a configuration space in which an optimal model of the machine learning among the entire configuration space is likely to be included, it may be possible to increase the probability of finding the optimal model of the machine learning within a limited time, or to find the optimal model of the machine learning in a short time. In addition, by reducing the search space and search time, computing resources and human resources for optimization of the model of the machine learning may be reduced.

FIG. 4 is a flowchart of an operation method of the apparatus 10 according to an exemplary embodiment of the inventive concept. Hereinafter, FIG. 4 is described with reference to FIG. 3A.

Referring to FIG. 4, the apparatus 10 may verify whether the data-set 50 is received (S110). When the data-set 50 is not received, the apparatus 10 does not proceed to a next step, and when the data-set 50 is received from the system or the user, the apparatus 10 performs the next step.

When the data-set 50 is received, the configuration space forming logic 110 forms the configuration space from the data-set 50 (S111). In addition, the meta-feature extractor 130 extracts the meta-feature MF from the data-set 50. In an exemplary embodiment, the forming of the configuration space and the extracting of the meta-feature MF for the data-set 50 are performed concurrently, but the inventive concept is not limited thereto. For example, the configuration space could be formed before or after the extracting of the meta-feature MF in alternate embodiments.

After the configuration space is formed from the data-set 50, the algorithm search logic 120 performs the algorithm search operation based on the configuration space (S113). For example, the algorithm search logic 120 may perform the algorithm search operation based on a certain configuration (for example, the first configuration) sampled in the configuration space.

Next, the meta-database 140 may receive the meta-feature MF from the meta-feature extractor 130, the configuration information C_I and the performance P_I from the algorithm search logic 120, and may store the meta-feature MF, the configuration information C_I, and the performance P_I (S114). Accordingly, as a selection operation of the model of the machine learning of the apparatus 10 is repeatedly performed in the meta-database 140, a large amount of data for the meta-learning may be accumulated.

Next, the meta-learning logic 150 performs the meta-learning based on the meta-feature MF, the configuration information C_I, and the performance P_I received from the meta-database (140) (S115). For example, the meta-learning logic 150 may execute the machine learning on a particular relationship from which the performance P_I is output in response to an input of the meta-feature MF and the configuration information C_I. Thus, the meta-learning logic 150 may output the execution result R_L of the meta-learning.

Next, the configuration space optimizer 160 and the configuration space forming logic 110 tune the configuration space (S116). For example, the configuration space optimizer 160 may select a configuration to be excluded from the configuration space based on the received execution result R_L of the meta-learning, and accordingly, may provide the exclusion configuration information E_I to the configuration space forming logic 110. The configuration space forming logic 110 may exclude some configuration spaces from the configuration space according to the exclusion configuration information E_I. Accordingly, the configuration space optimizer 160 and the configuration space forming logic 110 may optimize the configuration space.

Figure 5:
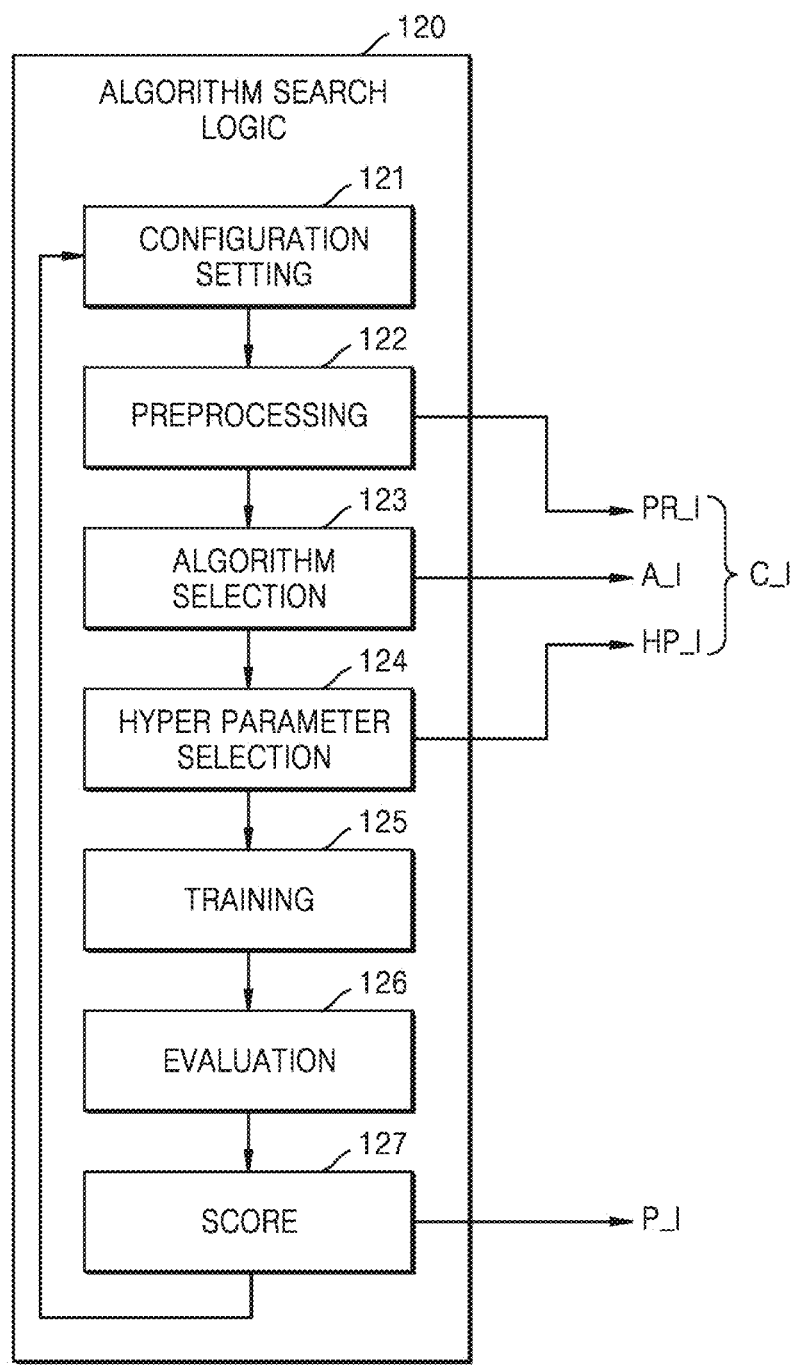
FIG. 5 is a block diagram of a detailed configuration of an algorithm search logic according to an exemplary embodiment of the inventive concept.

FIG. 5 is a block diagram of a detailed configuration of the algorithm search logic 120 according to an exemplary embodiment of the inventive concept. FIG. 5 may be, for example, a block diagram of the algorithm search logic 120 of FIG. 3A. Hereinafter, FIG. 5 is described with reference to FIG. 3A.

Referring to FIG. 5, the algorithm search logic 120 includes a configuration setting block 121, a preprocessing block 122, an algorithm selection block 123, a hyper-parameter selection block 124, a training block 125, an evaluation block 126, and a score calculation block 127. Each of the blocks provided in the algorithm search logic 120 may include, for example, a software block including a plurality of instructions (e.g., a computer-readable code) executed by a processor (for example, 100 in FIG. 1), or a hardware block including an analog circuit and/or a digital circuit.

In an embodiment, the configuration setting block 121 selects and sets a certain configuration in the configuration space formed in the configuration space forming logic 110. For convenience of description, the following description is given assuming that the configuration setting block 121 sets the first configuration included in the configuration space.

In an embodiment, the first configuration includes the preprocessing correlation information PR_I, the machine learning algorithm correlation information A_I, and hyper-parameter correlation information HP_I for the data-set 50. For example, the preprocessing correlation information PR_I may include information about the preprocessing methodology and may be a basis for executing an operation of the preprocessing block 122. In addition, the machine learning algorithm correlation information A_I may be a basis for executing an operation of the algorithm selection block 123.

For example, the hyper-parameter correlation information HP_I may include hyper-parameter correlation information corresponding to the preprocessing and hyper-parameter correlation information corresponding to the machine learning algorithm. The hyper-parameter correlation information HP_I may be a basis of performing an operation of the hyper-parameter selection block 124.

The machine learning of the training block 125 may be executed after the preprocessing block 122 performs the preprocessing operation on the data-set 50, after the algorithm selection block 123 performs the algorithm selection operation, and after the hyper-parameter selection block 124 performs the hyper-parameter selection operation. The hyper-parameter selection block 124 may select a hyper-parameter. In other words, the training block 125 may execute the machine learning based on the preprocessed data-set 50, the selected algorithm, and the selected hyper-parameter.

In the evaluation block 126, an evaluation on the machine learning of the training block 125 may be executed. In addition, in the score calculation block 127, a score of the machine learning may be derived based on the evaluation of the evaluation block 126. For example, the score calculation block 127 may select an evaluation metric by using various verification methods such as cross validation. For example, the performance P_I including at least one of the scores derived from the score calculation block 127, the computation time during learning, and the memory usage during the learning may be output from the algorithm search logic 120.

Accordingly, the algorithm search logic 120 may provide the meta-database 140 with the configuration information C_I and the performance P_I that are the basis of the operation, simultaneously with the algorithm search operation. Since the configuration information C_I and the performance P_I are a basis for the optimization of the configuration space according to the meta-learning, a result of the algorithm searching operation may be automatically reflected in a configuration space tuning.

After the operation of the score calculation block 127 is completed, when a result thereof does not meet certain ending criterion, the operation may be repeated by continuing to the configuration setting block 121. A unit of a series of operations of the blocks from the configuration setting block 121 to the score calculation block 127 may be referred to as a round. After the operation of the score calculation block 127 is completed, when a result thereof meets the certain ending criterion, the round may be terminated.

Figure 6:
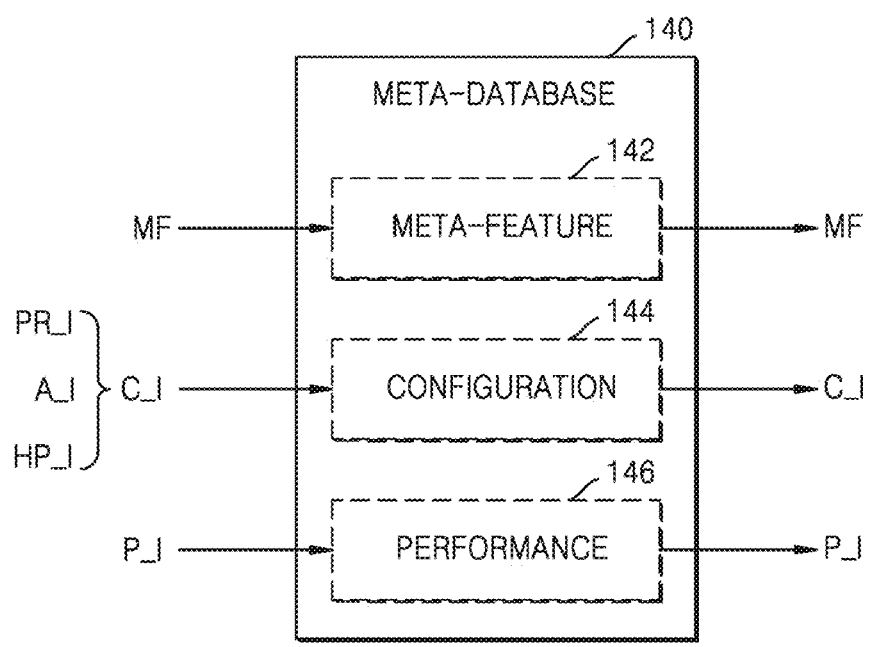
FIG. 6 is a block diagram of a detailed configuration of a meta-database according to an exemplary embodiment of the inventive concept.

FIG. 6 is a block diagram of a detailed configuration of the meta-database 140 according to an exemplary embodiment of the inventive concept. FIG. 6 may be, for example, a block diagram for the meta-database 140 in FIG. 3A. Hereinafter, FIG. 6 is described with reference to FIG. 3A.

Referring to FIG. 6, the meta-database 140 may store meta-feature data 142 by accumulating meta-features provided from the meta-feature extractor 130, configuration data 144 and performance data 146 which respectively accumulate the configuration information C_I and the performance P_I provided from the algorithm search logic 120. For example, the meta-database 140 may store meta-features, configuration information, and performance measures associated with the data-set 50.

In an embodiment, the configuration data 144 accumulating the configuration information C_I includes the preprocessing correlation information PR_I, the machine learning algorithm correlation information A_I, and the hyper-parameter correlation information HP_I. In addition, in an embodiment, the performance data 146 accumulating the performance P_I includes information about at least one of a score according to a result of executing the learning of the machine learning algorithm, a calculation time of performing the learning, and a memory usage in executing the learning. In an embodiment, the meta-database 140 does not store the data-set 50 itself, but instead stores only data (142, 144, and 146) that has accumulated from the meta-features MF, the configuration information C_I, and the performance P_I, and thus, the efficiency of a storage space may be increased.

FIG. 7A illustrates a first table TB1 including meta-features according to an embodiment. FIG. 7B illustrates a second table TB2 including meta-features according to another embodiment. In addition, FIG. 8 shows a third table TB3 including formulas for deriving respective meta-features.

Referring to FIGS. 7A and 8, the first table TB1 includes a plurality of categories and the meta-features categorized by each category. The meta-features classified according to a correlation category may be, for example, quantified values indicating degrees of correlations between inputs to predict a target according to the machine learning and the target. For example, a meta-feature of code $C_1$ may be a value obtained by quantifying a maximum value among the correlations between inputs and the targets predicted thereby, and may be derived from the following Formula 2. Hereinafter, x may be an input, y may be a target, d may be the number of inputs, and ρ may be the Spearman correlation coefficient.

$$C_1 = \max_{j=1,\dots,d} |\rho(x^j, y)| \quad \text{Formula 2}$$

A meta-feature of code $C_2$ may be a value obtained by quantifying a mean value of the correlations between inputs and the targets and may be derived by the following Formula 3.

$$C_2 = \sum_{j=1}^{d} \frac{|\rho(x^j, y)|}{d} \quad \text{Formula 3}$$

A meta-feature of code $C_3$ may be a value obtained by quantifying a ratio of examples to be removed for a high-correlation between targets for each input and may be derived by the following Formula 4. Here, n is the number of examples and $n^j$ is the number of examples to be removed for the high-correlation.

$$C_3 = \min_{j=1}^{d} \frac{n^j}{n} \quad \text{Formula 4}$$

A meta-feature of code $C_4$ may be a value obtained by performing linear fitting with an input having a highest correlation for each round, and based on a result thereof, performing for each input an operation of removing an example having a deviation thereof as equal to or less than a certain value (about 0.1 in the present example), and quantifying a ratio of remaining examples, and may be derived by the following Formula 5. Here, #{ } may be a function representing the number, ∈ may be a residual value, $T_1$ may be a data-set after one round is completed, and n may be the number of examples.

$$C_4 = \frac{\#\{x_i \| \epsilon_i| > 0.1\}_{T_l}}{n} \quad \text{Formula 5}$$

Next, meta-features classified according to a linearity category may be, for example, values obtained by quantifying linearity between the inputs and the targets. For example, a meta-feature of code $L_1$ may be a value obtained by quantifying a residual absolute value mean in multiple linear regression, and may be derived by the following Formula 6. Here, ∈ may be a residual value in the multiple linear regression and n may be the number of examples.

$$L_1 = \sum_{i=1}^{n} \frac{|\epsilon_i|}{n} \quad \text{Formula 6}$$

A meta-feature of code $L_2$ may be a value obtained by quantifying a mean of squared residuals in the multiple linear regression and may be derived by the following Formula 7. (Here, ∈ may be a residual value in the multiple linear regression and n may be the number of examples.)

$$L_2 = \sum_{i=1}^{n} \frac{\epsilon_i^2}{n} \quad \text{Formula 7}$$

A meta-feature of code $L_3$ may be a value obtained by pairing two examples corresponding to a nearby target, generating a new point by randomly interpolating the input and the target, and quantifying a mean of differences between the new points and values predicted by using the multiple linear regression model for original data, and may be derived by the following Formula 8. (Here, l may be the number of interpolated examples, $x'_i$ may be an interpolated input, $y'_i$ may be an interpolated target, and f may be the multiple linear regression model for original data).

$$L_3 = \frac{1}{l} \sum_{i=1}^{l} (f(x'_i) - y'_i)^2 \quad \text{Formula 8}$$

Next, meta-features classified according to a smoothness category may be, for example, quantified values indicating degrees of minute changes in target spaces due to minute changes in input spaces. For example, a meta-feature of code $S_1$ may be a value obtained by generating a distance between the inputs according to weights thereof by using a Minimum spanning tree (MST), and quantifying a mean of differences between targets respectively corresponding to two correlated examples, and may be derived by the following Formula 9. Here, n may be the number of pairs in the MST and y may be the target.

$$S_1 = \frac{1}{n} \sum_{i,j \in MST} |y_i - y_j| \quad \text{Formula 9}$$

A meta-feature of code $S_2$ may be a value obtained by arranging targets, pairing nearby targets, and quantifying a mean of measured values of distance between the inputs corresponding to the nearby targets, and may be derived by the following Formula 10. Here, n may be the number of examples and x may be the input.

$$S_2 = \frac{1}{n} \sum_{i=2}^{n} \|x_i - x_{i-1}\|_2 \quad \text{Formula 10}$$

A meta-feature of code $S_3$ may be a value obtained by quantifying a mean of leave-one-out errors for regression of a nearest neighbor model, and may be derived by the following Formula 11. Here, n may be the number of examples, x may be the input, NN may be the nearest neighbor model, and $y_i$ may be a true target.

$$S_3 = \frac{1}{n}\sum_{i=1}^{n}(NN(x_i) - y_i)^2 \qquad \text{Formula 11}$$

A meta-feature of code $S_4$ may be a value obtained by pairing two examples respectively corresponding to nearby targets, generating a new point by randomly interpolating the input and the target, and quantifying a mean of differences between a mean of differences between the new point and a value predicted by using the nearest neighbor model for original data, and may be derived by the following Formula 12. Here, l may be the number of examples, $x'_i$ may be the interpolated input, $y'_i$ may be the interpolated target, and NN may be the nearest neighbor model.

$$S_4 = \frac{1}{l}\sum_{i=1}^{l}(NN(x'_i) - y'_i)^2 \qquad \text{Formula 12}$$

Next, meta-features classified according to a distribution density category may be, for example, a quantified values distribution density of data points in the configuration space. For example, a meta-feature of code $D_1$ may be a value obtained by quantifying a logarithmic value for the number of examples, and may be derived from the following Formula 13. Here, n may be the number of examples.

$$D_1 = \log 10(n) \qquad \text{Formula 13}$$

A meta-feature of code $D_2$ may be a value obtained by quantifying a ratio of the number of examples over the number of inputs, and may be derived by the following Formula 14. Here, n may be the number of examples and d may be the number of inputs.

$$D_2 = \frac{n}{d} \qquad \text{Formula 14}$$

A meta-feature of code $D_3$ may be a value obtained by quantifying the number of components having explained variance ratios as equal to or more than about 95% in a principal component analysis (PCA), and may be derived by the following Formula 15. Here, x may be an input, and $N_r$ may be the number of components.

$$D_3 = \min N_T(PCA(x) > 95\%) \qquad \text{Formula 15}$$

A meta-feature of code $D_4$ may be a value obtained by quantifying a ratio of missing values over the entire data, and may be derived by the following Formula 16. (Here, n may be the number of examples, d may be the number of inputs, and m may be the number of missing values.)

$$D_4 = \frac{m}{n*d} \qquad \text{Formula 16}$$

Referring to FIG. 7B, the second table TB2 may further include meta-features associated with semiconductor correlation information in addition to the second table TB1 of FIG. 7A. In an embodiment, when the semiconductor correlation information is included in the data-set 50, the meta-features extracted from the data-set 50 may appear as shown in the second table TB2.

For example, a meta-feature of code S5 and a meta-feature of code S6 may be added to the smoothness category. The meta-feature of code S5 may be a value obtained by forming the nearest neighbor regression model based on distances on a wafer and quantifying a mean squared error according to a comparison with an actual value, and may be derived by Formula 17. Here, n may be the number of examples, x may be an input, y may be a true target, $NN_w$ may be the nearest neighbor model on the wafer.

$$S_5 = \frac{1}{n}\sum_{i=1}^{n}(NN_w(x_i) - y_i)^2 \qquad \text{Formula 17}$$

The meta-feature of code $S_6$ may be a value obtained by pairing two examples adjacent to each other on the wafer, generating a new point by randomly interpolating the input and the target, and quantifying a mean of squared difference between the new point and a value predicted for the new point by using the multiple regression model for original data, and may be derived by the following Formula 18. Here, l may be the number of examples, $x_i$ may be the interpolated input, $y_i$ may be the interpolated target, and f may be a spatial linear regression model.

$$S_6 = \frac{1}{l}\sum_{i=1}^{l}(f_w(x_{i+1}, x_{i-1},) - y_i)^2 \qquad \text{Formula 18}$$

For example, a meta-feature of code $D_5$ and a meta-feature of code $D_6$ may be added to the density category. The meta-feature of code $D_5$ may be a value obtained by quantifying a standard deviation of the missing value distribution per wafer, and may be derived by the following Formula 19. $d_w$ may be the missing value distribution of a wafer. For example, code $D_5$ may be a measure of chip distribution randomness and code $D_6$ may be a measure of a chip ratio on a wafer.

$$D_5 = \sigma(d_w(\text{missing})) \qquad \text{Formula 19}$$

The meta-feature of code $D_6$ is a value obtained by quantifying a ratio of measured chips over the number of chips included in the wafer, and may be derived by the following Formula 20.

$$D_6 = \frac{C_{measured}}{C_{total}} \qquad \text{Formula 20}$$

In an embodiment, wafer statistics and meta-information are included in the second table TB2 as categories. For example, meta-features classified according to the wafer statistics category may be values quantifying a result of comparing in-wafer statistics with wafer-to-wafer statistics. For example, a meta-feature of code $W_1$ may be a value obtained by quantifying a mean of absolute values of differences between inter-wafer means and intra-wafer means. Hereinafter, d may be the number of inputs, w may be the number of wafers, $x^{agg}$ may be an aggregated value per wafer, and $x^{in}$ may be a value of a chip on a wafer.

$$W_1 = \frac{1}{dw}\sum_i^d \sum_j^w |E[x_{i,j}^{agg}] - E[x_{i,j}^{in}]| \qquad \text{Formula 21}$$

A meta-feature of code $W_2$ may be a value obtained by quantifying a mean of differences between inter-wafer variances and intra-wafer variances, and may be derived by the following Formula 22.

$$W_2 = \frac{1}{d}\sum_i^d (\text{Var}(x_i^{agg}) - \text{Var}(x_i^{in})) \qquad \text{Formula 22}$$

A meta-feature of code $W_3$ may be a value obtained by quantifying a mean of absolute values of differences between inter-wafer skewness and intra-wafer skewness, and may be derived by the following Formula 23. Skewness may a measure of symmetry or the lack of symmetry.

$$W_3 = \frac{1}{d}\sum_i^d E\left[\left(\frac{x_i^{agg} - \mu_i^{agg}}{\sigma^{agg}}\right)^3\right] - E\left[\left(\frac{x_i^{in} - \mu_i^{in}}{\sigma^{in}}\right)^3\right] \qquad \text{Formula 23}$$

A meta-feature of code $W_4$ may be a value obtained by quantifying a mean of absolute values of differences between inter-wafer kurtosis and intra-wafer kurtosis, and may be derived from the following Formula 24. Kurtosis may be a measure of whether data is heavy-tailed or light-tailed relative to a normal distribution.

$$W_4 = \frac{1}{d}\sum_i^d E\left[\left(\frac{x_i^{agg} - \mu_i^{agg}}{\sigma^{agg}}\right)^4\right] - E\left[\left(\frac{x_i^{in} - \mu_i^{in}}{\sigma^{in}}\right)^4\right] \qquad \text{Formula 24}$$

A meta-feature of code $W_5$ may be a value obtained by quantifying dispersion of a target in a radial direction on a wafer, and may be derived by the following Formula 25. Here, y may be a target and r may be a radius of a chip.

$$W_5 = \text{Var}(y(r)) \qquad \text{Formula 25}$$

For example, meta-features classified according to the meta-information category may be values obtained by quantifying information about a product. In an example, a meta-feature of code $M_1$ may be a value obtained by quantifying information about the product, and a meta-feature of code $M_2$ may be a value obtained by quantifying information about a development stage.

Figure 9:
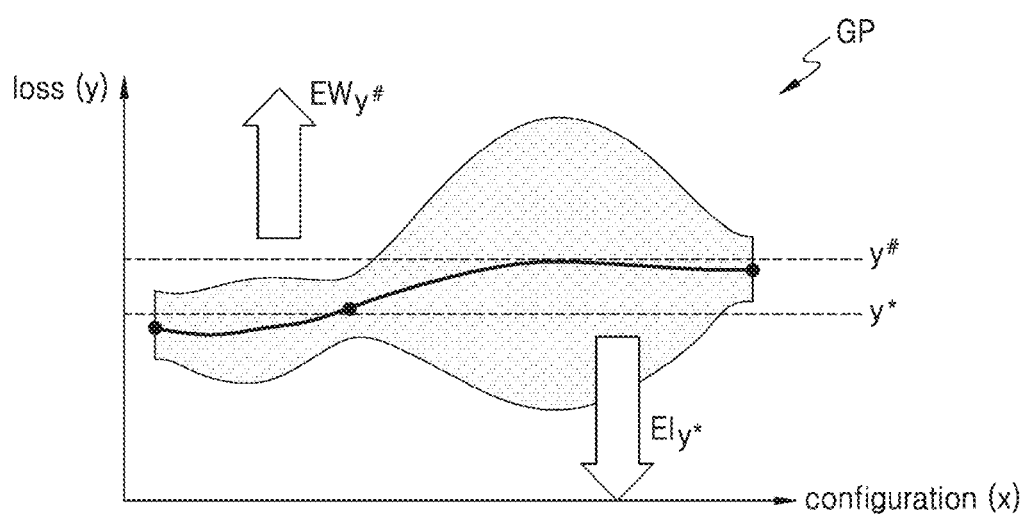
FIG. 9 is a graph of loss of machine learning according to a calculated configuration, according to an exemplary embodiment of the inventive concept.

FIG. 9 is a graph GP of loss of the machine learning according to a calculated configuration, according to an embodiment. The loss may be, for example, a concept contrary to the performance of the machine learning. FIG. 9 is described with reference to FIG. 3A.

Referring to FIG. 9, a region of loss occurring according to each configuration may be expressed as the graph GP. In addition, a first reference value $y^{\#}$ for deriving an expected worsening value EW (e.g., an expected degradation value) and a second reference value $y^*$ for deriving an expected improvement value EI may be illustrated on the graph GP. In the embodiment, the first reference value $y^{\#}$ is illustrated to be greater than the second reference value $y^*$. However, in an alternate embodiment, the first reference value $y^{\#}$ and the second reference value $y^*$ are the same.

For example, based on the graph GP, the meta-learning logic 150 may calculate an expected worsening value $EW_{y,\#}$ (e.g., an expected degradation value) based on the first reference value $y^{\#}$ according to the following Formula 26, and an expected improvement value $EI_{y,*}$ based on the second reference value $y^*$ according to the following Formula 27, respectively. As the expected improvement value $EI_{y,*}$ increases, a probability of a good result of the machine learning in a configuration corresponding thereto may increase, while as the expected worsening value $EW_{y,\#}$ (e.g., an expected degradation value) increases, a probability of a bad result of the machine learning in a configuration corresponding thereto may increase.

$$EW_{y,\#}(x) = \int_{-\infty}^{\infty} \max(y - y^{\#}, 0) p_M(y|x) dy \qquad \text{Formula 26}$$

$$EI_{y,*}(x) = \int_{-\infty}^{\infty} \max(y^* - y, 0) p_M(y|x) dy \qquad \text{Formula 27}$$

In an embodiment, when a value of the expected worsening value $EW_{y,\#}$ (e.g., an expected degradation value) divided by the expected improvement value $EI_{y,*}$ is greater than a preset certain value, the configuration space optimizer 160 may select configurations for the expected worsening value $EW_{y,\#}$ (e.g., an expected degradation value) and the expected improvement value $EI_{y,*}$ as configurations to be removed from the configuration space.

Figure 10:
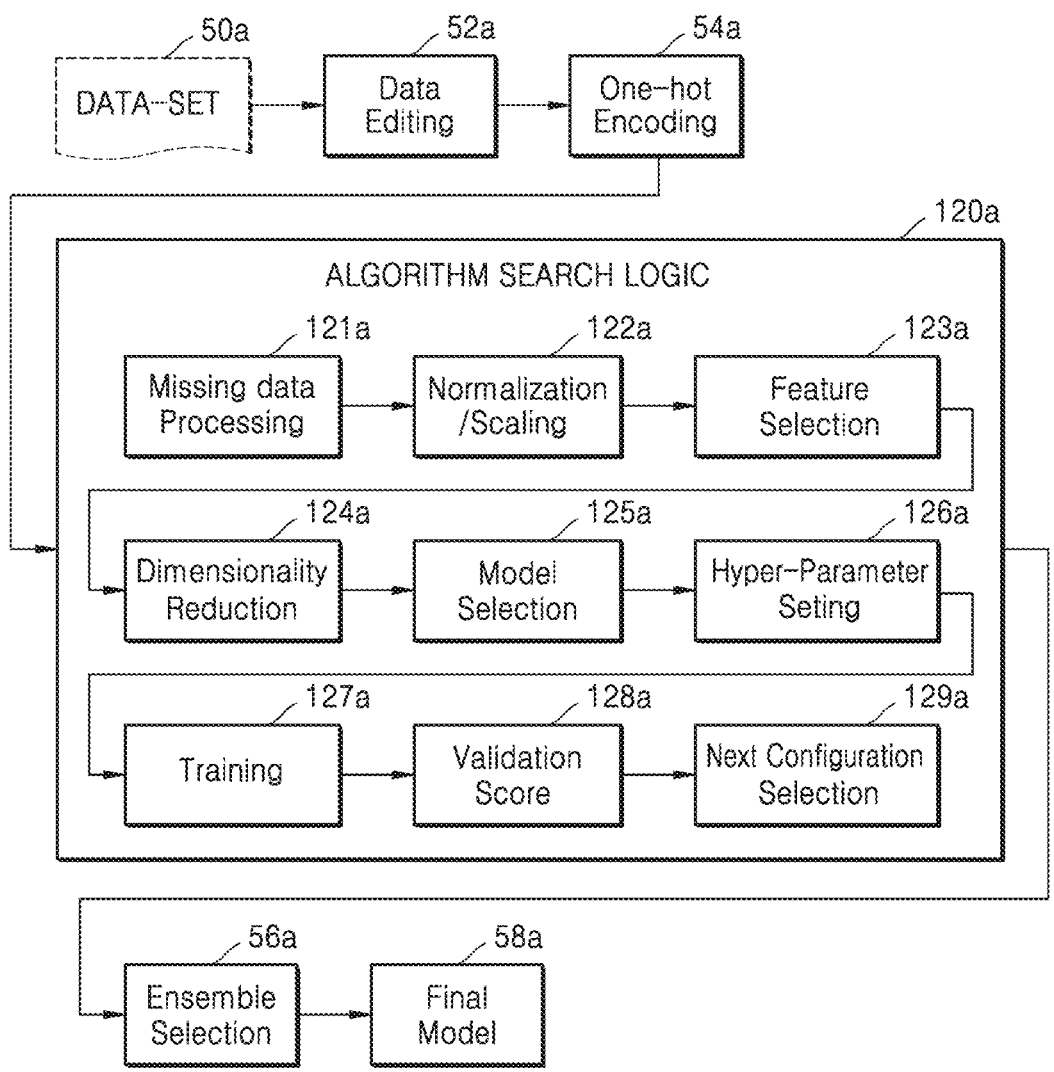
FIG. 10 is a block diagram for explaining a configuration space to be searched according to an exemplary embodiment of the inventive concept.

FIG. 10 is a block diagram for explaining a configuration space to be searched according to an exemplary embodiment of the inventive concept. For example, FIG. 10 briefly illustrates a selection of a model of the machine learning based on the Bayesian optimization in the selection of the model of the machine learning executed for an input data-set 50a.

Referring to FIG. 10, data-editing 52a and one-hot encoding may be sequentially executed on the data-set 50a, and then an algorithm search logic 120a may be executed. In an embodiment, a one-hot encoding is a process by which categorical variables are converted into a form that can be provided to a machine learning algorithm (e.g., textual labels of categories can be converted into unique numerical values). The algorithm search logic 120a may sequentially execute, based on, for example, the Bayesian optimization, missing data processing 121a, normalization/scaling 122a, feature selection 123a, dimensionality reduction 124a, model selection 125a, hyper-parameter setting 126a, training 127a, and validation score 128a. After a search operation of one round is completed, a next configuration selection 129a for a next round may be executed and the rounds may be repeated by continuing to the missing data processing 121a. When a certain ending criterion is satisfied after an end of each round, the algorithm search logic 120a may be terminated and an ensemble selection 56a may be selected, and then, a final model 58a may be selected.

In the present embodiment, each configuration of the configuration space which is a basis of the machine learning may include information about at least one of a missing data processing methodology, a hyper-parameter of the missing data processing methodology, a normalization methodology, a hyper-parameter of the normalization methodology, a feature selection methodology, a hyper-parameter of the feature selection methodology, a dimension reduction methodology, a hyper-parameter of the dimension reduction methodology, the machine learning algorithm, and the hyper-parameter of the machine learning algorithm. In another embodiment, each configuration of the configuration space which is a basis of the machine learning may further include information about at least one of an evaluation methodology, a score calculation methodology, and an optimal configuration selection methodology.

Figure 11:
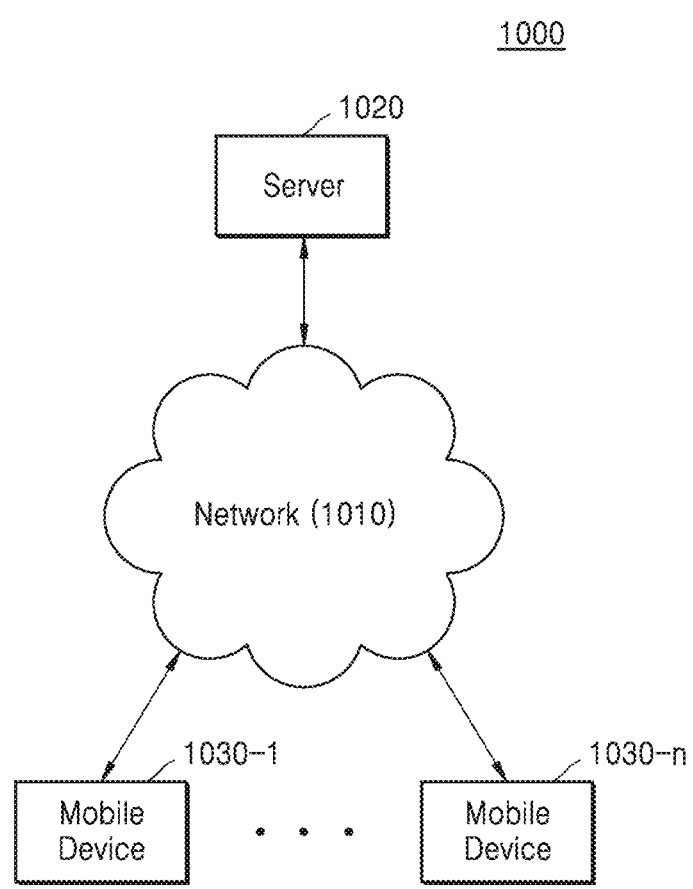
FIG. 11 is a block diagram of a network system according to an exemplary embodiment of the inventive concept.

FIG. 11 is a block diagram of a network system 1000 according to an exemplary embodiment of the inventive concept.

Referring to FIG. 11, the network system 1000 includes a server 1020 and first through nth mobile devices 1030-1 through 1030-$n$ (where n is a positive integer greater than 1). The first through $n^{th}$ mobile devices 1030-1 through 1030-$n$ may be, for example, autonomous vehicles, robots, smart phones, tablet devices, augmented reality (AR) devices, and Internet of things (IoT) devices. For example, the server 1020 may receive various data from the first through $n^{th}$ mobile devices 1030-1 through 1030-$n$ and execute various machine learning based on the received data.

The server 1020 may execute various machine learning exercises to provide a result of the machine learning to the first through $n^{th}$ mobile devices 1030-1 through 1030-$n$ via the network 1010. In an embodiment, the server 1020 may execute an optimization operation on the configuration space for the machine learning on various test data-sets (for example, 50 in FIG. 3A), and accordingly, may select an optimal model of the machine learning. For example, the server 1020 may select the optimal model of the machine learning even when time and resources are limited by adopting at least one embodiment of the inventive concept described above with reference to FIGS. 1 through 11.

The foregoing descriptions of the embodiments are merely examples with reference to the drawings for a more thorough understanding of the inventive concept, and thus should not be construed as limiting the inventive concept. In addition, it will be apparent to those of ordinary skill in the art that various changes and modifications may be made without departing from the basic principles of the inventive concept.

What is claimed is:

1. A method of selecting a machine learning algorithm for execution by a processor, the method comprising:
    configuring, by the processor, a configuration space for machine learning based on a data- set, the configuration space including a plurality of different configurations;
    extracting, by the processor, a meta-feature comprising quantitative information about the data-set from the data-set;
    calculating, by the processor, a performance of each configuration, wherein the calculating includes the processor selecting a machine learning algorithm for the configuration and executing the machine learning algorithm on the data-set to generate the performance;
    for each configuration, the processor executing meta-learning on the configuration, the meta-feature, and the performance of the configuration to derive an expected improvement value and an expected worsening value;
    excluding, by the processor, one of the configurations based on the expected improvement value and the expected worsening value of each of the configurations; and
    selecting, by the processor, the machine learning algorithm of one of the remaining configurations for execution
    wherein each configuration includes information about the selected machine learning algorithm, and
    wherein the excluding occurs when a value of the expected worsening value divided by the expected improvement value is greater than a certain value.

2. The method of claim 1, wherein each configuration comprises at least one of preprocessing correlation information about a preprocessing methodology for the machine learning algorithm for preprocessing the at least one data-set, machine learning algorithm correlation information about the machine learning algorithm, hyper-parameter correlation information about the preprocessing methodology, and hyper-parameter correlation information about the machine learning algorithm.

3. The method of claim 2, wherein calculating of the performance comprises:
    executing preprocessing on the data-set based on the preprocessing correlation information to generate preprocessed data;
    selecting a certain algorithm based on the machine learning algorithm correlation information;
    selecting a hyper-parameter based on the hyper-parameter correlation information about the preprocessing methodology and the hyper-parameter correlation information about the certain algorithm; and
    deriving the calculated performance by executing the selected certain algorithm on the preprocessed data, based on the selected hyper-parameter.

4. The method of claim 1, further comprises storing the meta-feature, the plurality of configurations, and the calculated performance into a meta-database.

5. The method of claim 4, wherein the executing of the meta-learning comprises executing the meta-learning based on the meta-feature, the plurality of configurations, and the calculated performance that are stored in the meta-database.

6. The method of claim 1, wherein the executing of the meta-learning comprises:
    deriving an empirical mean and a variance of the calculated performance according to the plurality of configurations; and
    deriving the expected improvement value and the expected worsening value for each of the plurality of configurations based on the empirical mean and the variance of the calculated performance.

7. The method of claim 1, data set includes semiconductor correlation information, and the extracting of the meta-feature comprises extracting the meta-feature associated with the semiconductor correlation information.

8. The method of claim 7, wherein the extracting of the meta-feature associated with the semiconductor correlation information comprises extracting at least one of a meta-feature corresponding to smoothness associated with the semiconductor correlation information in the configuration space, a meta-feature corresponding to distribution density associated with the semiconductor correlation information in the configuration space, and a meta-feature corresponding to statistics associated with the semiconductor correlation information.

9. A method of selecting a machine learning algorithm for execution by a processor, the method comprising:
    forming, by the processor, a configuration space for machine learning based on a data-set, the configuration space including a plurality of different configurations;
    calculating, by the processor, a performance of each configuration, wherein the calculating includes the processor searching for a machine learning algorithm for the configuration and executing the machine learning algorithm on the data-set to generate the performance;
    extracting, by the processor, a meta-feature comprising quantitative information about at least one of information about correlation associated with the data-set, information about linearity, information about smoothness, and information about a distribution density, from the data-set;

for each configuration, the processor executing meta-learning on the configuration, the meta-feature, and the performance of the configuration to derive an expected improvement value and an expected worsening value;

excluding, by the processor, one of the configurations based on the expected improvement value and the expected worsening value of each of the configurations; and selecting, by the processor, the machine learning algorithm of one of the remaining configurations for execution wherein each configuration includes information about the selected machine learning algorithm, and wherein the excluding occurs when a value of the expected worsening value divided by the expected improvement value is greater than a certain value.

10. The method of claim 9, wherein the calculating of the performance comprises:

executing preprocessing on the data-set based on the plurality of configurations to generate preprocessed data;

selecting a certain algorithm based on the plurality of configurations;

selecting a hyper-parameter for each of the preprocessing and the certain algorithm based on the plurality of configurations; and deriving the performance by executing the selected certain algorithm on the preprocessed data based on the hyper-parameter.

11. The method of claim 9, wherein the executing of the meta-learning comprises storing the meta-feature, the plurality of configurations, and the performance into a meta-database.

12. The method of claim 9, wherein the excluding comprises:

deriving an empirical mean and a variance of the performance according to the plurality of configurations; and deriving the expected improvement value and the expected worsening value for each of the plurality of configurations based on the empirical mean and the variance.

13. A device comprising:

a memory configured to store computer-readable code therein; and a processor operatively coupled to the memory, the processor being configured to execute the computer-readable code, wherein the computer-readable code is configured to:

form a configuration space for machine learning based on a data-set, the configuration space including a plurality of different configurations;

extract, from the data-set, a meta-feature comprising quantitative information about the data-set;

calculate a performance of each configuration, by selecting a machine learning algorithm for the configuration and executing the machine learning algorithm on the data-set;

for each configuration, executing meta-learning on the configuration, the meta-feature, and the performance of the configuration to derive an expected improvement value and an expected worsening value;

exclude one of the configurations based on the expected improvement value and the expected worsening value of each of the configurations; and select the machine learning algorithm of one of the remaining configurations for execution by the processor wherein each configuration includes information about the selected machine learning algorithm, and wherein the exclude occurs when a value of the expected worsening value divided by the expected improvement value is greater than a certain value.

14. The device of claim 13, further comprising a meta-database, wherein the processor is configured to provide the meta-database with the meta-feature, the, the configurations and the performance, and the meta-database is configured to store the meta-feature, the configurations, and the performance of each configuration.

15. The device of claim 13, wherein the processor is configured to extract, in response to a determination that the data-set comprise semiconductor correlation information, at least one of a meta-feature corresponding to smoothness associated with the semiconductor correlation information from the at least one data-set, a meta-feature corresponding to a distribution density associated with the semiconductor correlation information in the configuration space, and a meta-feature corresponding to statistical data associated with the semiconductor correlation information.

* * * * *